Jan. 30, 1962 C. T. GRIFFIN ETAL 3,018,601
APPARATUS FOR SEPARATING GRAIN FROM WEEDS (WEED DEFLECTOR)
Filed Oct. 26, 1959
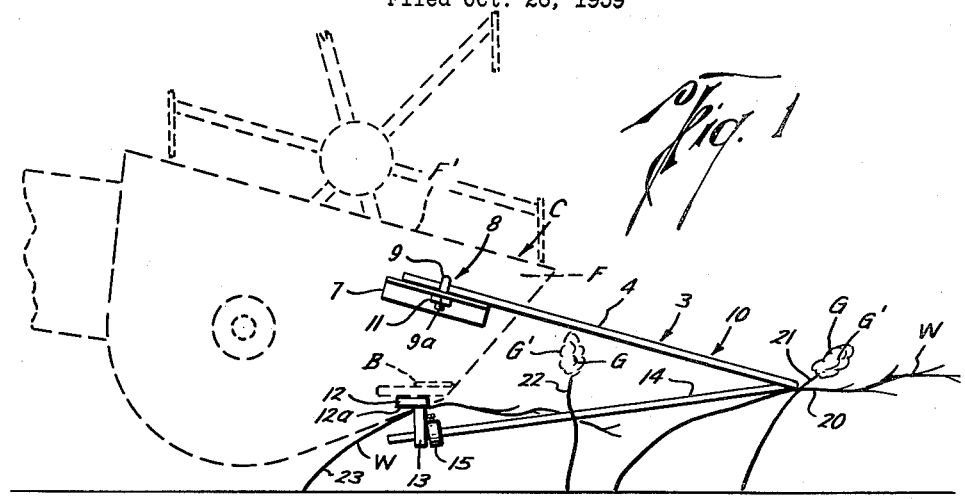
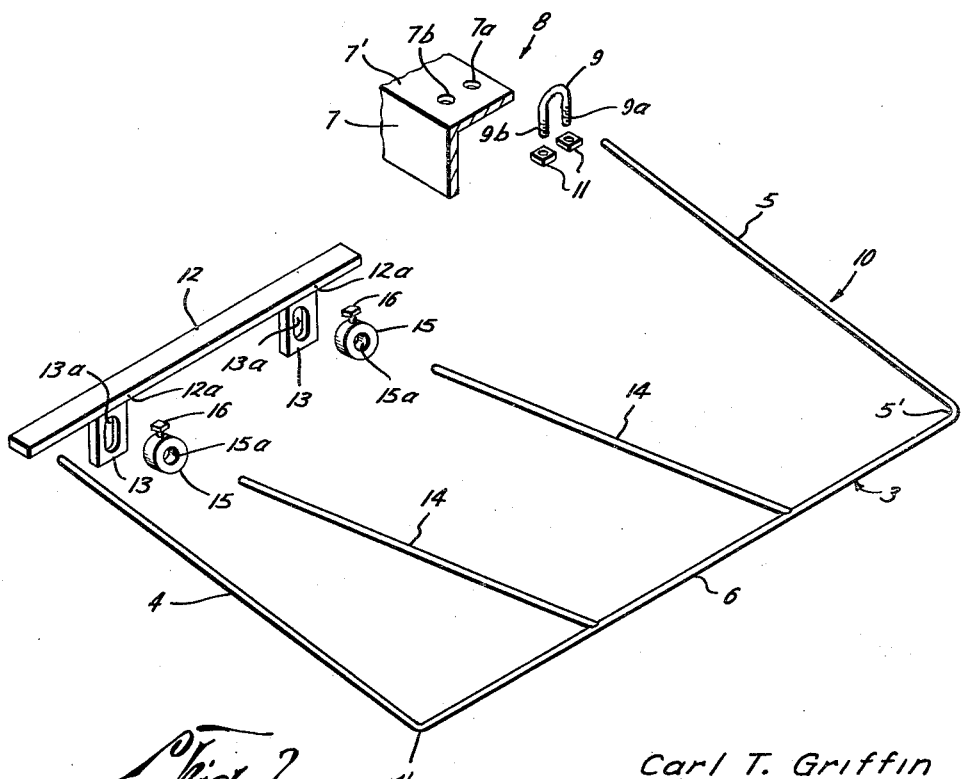
Carl T. Griffin
Ross A. Griffin
INVENTORS
BY Hayden & Pasnel
ATTORNEYS 3,018,601
APPARATUS FOR SEPARATING GRAIN FROM
WEEDS (WEED DEFLECTOR)
Carl T. Griffin and Ross A. Griffin, both
% General Delivery, Mathis, Tex.
Filed Oct. 26, 1959, Ser. No. 848,658
5 Claims. (Cl. 56—119)

The device of the present invention particularly relates to an apparatus for deflecting weeds or the like away from the cutting blades of a combine or other harvesting machine during harvesting operations.

Weeds have always been a problem to the farmer, and when harvesting time comes they become even more of a problem. Where a combine or other harvesting machine is used in harvesting grain or the like, the cutting blades of the machine are set at a height in relation to the height of the grain to be harvested. That is, the height of the cutting blades is adjusted so that such height is just sufficient to permit the removal of the flower of the grain from the stalk. As can easily be seen, any weeds in the grain field growing as tall as the grain stalk or at a height above the height of the cutting blades will be harvested along with the grain.

The device of the present invention overcomes the above problem by providing an apparatus which is attached to a combine or other harvesting machine and which deflects the weeds taller than the grain to be harvested away from the cutting blades.

It is therefore an important object of the present invention to provide a new and improved means for substantially preventing or eliminating the harvesting of the weeds together with the harvesting of the grain.

An object of the present invention is to provide a new and improved means for deflecting weeds away from the cutting blades of the harvesting machine which may be quickly and easily attached to the combine or harvesting machine and which may be readily adjusted for deflecting weeds of any height.

Another object of the present invention is to provide a new and improved means for deflecting weeds from the cutters or cutting blades of a combine or the like which may be manufactured at relatively low cost and which may be sold relatively cheap.

Still another object of the present invention is to provide a new and improved apparatus for preventing weeds from being harvested with the grain which apparatus may be easily included in the manufacture of new harvesting machines or combines and which may be readily installed on old harvesting machines or combines.

Other objects and advantages of the present invention will become more readily apparent from a consideration of the following description and drawings wherein:

FIG. 1 is a side elevation illustrating a portion of a combine or harvesting machine in dotted line and the position of the present invention on the combine or harvesting machine during operation; and FIG. 2 is an exploded view of the apparatus of the present invention.

In the drawings, the device of the present invention is referred to generally at 10, and consists principally of a U-shaped member 3 which includes the legs 4 and 5 with the center member 6 extending therebetween. The member 3 is mounted or attached to a combine or other harvesting machine C so that the center or depressing member 6 is positioned in advance of the cutting blades B so as to depress the weeds W and prevent their being harvested with the grain G, as will be more fully explained.

The U-shaped depressing member 3 may be made from one continuous rod or bar in which event the side legs or lateral members 4 and 5 are formed by reason of the substantially right angle bends in the continuous bar or rod as illustrated at 4' and 5' respectively, and the base of the U-shaped member is formed by the member 6 which extends between the right angle bends 4' and 5'. The length of the legs 4 and 5 may be of any suitable extent so that the position of the member 3 may be adjusted relative to the cutting blades B of the harvesting machine C. The length of the member 6 extending between the side legs 4 and 5 is such that it will span the length of the cutting blades B, thereby enabling the member 6 to depress the weeds in advance of the cutting blades B and also to permit the side legs 4 and 5 to be secured on the outer surface of the frame F of the harvesting machine C.

The connection means is designated generally by the numeral 8 in FIG. 1 of the drawings, and is provided on the outer surface of the frame F of each side of the harvesting machine C. In the drawings, the connection means generally designated at 8 is illustrated as including the angle iron 7 which is secured to the frame F by any suitable means, such as welding or the like. Suitable openings 7a and 7b are provided in the portion 7' of the angle iron 7 which portion 7' extends laterally from the outer surface of the frame F for receiving a U bolt 9 therethrough. The U bolt 9 is provided with threaded end portions 9a and 9b on each of its legs and such legs are of sufficient length so that when the U bolt is positioned as shown in FIG. 1 of the drawings, it will engage each of the legs 4 and 5 of the member 3 and extend through the portion 7' of the angle iron 7 so that the U bolt may then be engaged and locked in position on the portion 7' by the nuts 11 which engage with each of the threaded end portions 9a and 9b of the U bolt 9.

In order to position the U-shaped member 3 in position on the harvesting machine C, the lateral members, or side legs 4 and 5 are positioned on the portion 7' of each of the angle irons 7. The U bolt 9 is then positioned over the legs 4 and 5 and through the portion 7' so that the threaded end portions 9a and 9b extend through the portion 7' to enable them to be engaged by the nuts 11 whereby each of the side legs 4 and 5 of the member 3 are held or locked in position relative to the harvesting machine C and relative to the blades B thereof.

In order to provide further support and rigidity to the member 3, additional support means are provided to enable the depressing member 3 to accomplish its intended function. As shown in the drawings, a bar 12 may be secured to the harvesting machine C by any suitable means, and as illustrated, is positioned longitudinally and under the cutting blades B so as to not interfere with the function thereof. Secured to the bar 12 are the depending members 13 which are attached to the underside 12a of the bar 12 by any suitable means such as welding or the like and are provided with longitudinal slots or openings 13a therein for receiving the brace members 14 which are connected to the depressing member 3.

The brace members 14 are secured to the member 6 and extend therefrom and downwardly at an angle relative to the side legs 4 and 5 as more clearly illustrated in FIG. 1 of the drawings. The brace members 14 are adapted to be received in the openings 13a of the depending members 13 on the horizontal bar 12.

The brace members 14 prevent the member 6 from flexing when it engages the weeds as shown in FIG. 1 of the drawings and maintain it in position as the harvesting machine C moves through the field. It can be appreciated that the force of the weeds against the member 6 as the combine with the invention 10 secured thereto moves through the field may be substantial, and in order to prevent the central member 6 from moving away from its adjusted position, or in order to prevent it from breaking or becoming damaged, the members 14 are provided.

In order to lock the members 14 from movement in the openings 13 suitable stop collars 15 are provided. The collars or sleeves 15 are provided with openings 15a therein whereby they may be positioned longitudinally along the bars 14 as desired. A set screw 16 extends radially through each of the stop collars or sleeves 15 whereby the stop collars or sleeves 15 may be locked in position on each of the braces 14. It can be appreciated that this construction provides an arrangement whereby the position of the stop collars or sleeves 15 on the members 14 may be adjusted in relation to the position of the side legs 4 and 5 in the connecting means 8 on the side of the machine as previously described.

While two support or brace members 14 are illustrated, it may be desirable under some circumstances to provide additional braces to support the member 6 extending between the side legs 4 and 5. Additionally, in some circumstances the members 13 may be directly attached to the harvesting machine C without the provision of the bar 12, and it can be appreciated that certain structural modifications such as above noted, and others, may be accomplished without departing from the scope of the invention.

The device 10 of the present invention as illustrated in the drawings is in simple form and it should be understood that any changes in the size, shape or materials used therein may be made without departing from the scope of the invention.

In the use of the invention 10, the first step, of course, is to adjust the height of the cutting blades B of the combine C so that only the fruit or flower G' of the grain G will be cut or harvested (FIG. 1). The average height of the weeds W must next be determined. After such height is determined, the nuts 11 on each of the U bolts 9 are loosened and each of the set screws 16 on the sleeves 15 are also loosened thereby permitting the member 3 to be adjusted so that the depressing bar or rod 6 may be positioned at a desired distance in front of or in advance of the cutting blades B, so that the bar or rod 6 will depress the weeds W and hold them in such depressed manner so that the weeds W will not be in a position to properly contact the cutting blades B of the combine or harvesting machine C to effect cutting thereof. After the bar 3 has been adjusted to position the member 6 in advance of the cutting blades so as to contact the weeds W in a proper manner and hold them depressed so as to not interfere with the harvesting of the flower G' of the grain G, the nuts 11 may be tightened so as to lock the side legs 4 and 5 in position, and the set screws 16 on each of the stop collars 15 may be tightened so as to hold the members 14 against movement when the member 6 contacts the weeds W as illustrated in FIG. 1 of the drawings.

From the above description, it is appreciated that the harvesting machine C with the invention 10 thereon may then be moved through the field at a normal speed and the member 6 extending between the side legs 4 and 5 will contact the weeds W as illustrated in FIG. 1 and bend them down as shown at 20. The grain G is shorter in height than the weeds W as illustrated at 21, and it will be noted that while the member 6 contacts the grain, the grain, by reason of its height, will move to the position as illustrated at 22 of the drawings so that it may be properly engaged by the cutting blades B to enable the flower G' to be removed. However, the member 6 will retain the weeds W in depressed position to enable the harvesting machine C to move forward and by the time the harvesting machine C has moved forward, the weeds will then be depressed by engagement with the harvesting machine C as illustrated at 23. The weeds, when depressed in this manner, are prevented from engaging the cutting blades B in a manner so as to enable cutting of the weeds.

Thus, the weeds are prevented from being cut on the one hand, while on the other hand, the cutting of the grain is not interfered with.

The present invention has been found to be quite practical and successful in actual use in that it eliminates the cutting of the weeds, while not interfering with the harvesting of the grain crop.

In grain fields where weeds grow to various heights it will be necessary to make adjustments in the position of the device 10 on the harvesting machine C. With the simple connection means 8 and the stop collars 15 adjustments may be made rapidly and easily, requiring only a wrench or pair of pliers.

To facilitate the location of the desired adjustment position of the members 4 and 5, calibrations in relation to the height of the weeds W and the height of the cutting blades B may be placed on the members 4 and 5.

Broadly, the invention relates to a device adapted to be secured to a harvesting machine such as a combine or the like for deflecting weeds away from the cutting blades of the harvesting machine, while not interfering with the normal harvesting operation.

What is claimed is:

1. An apparatus for deflecting weeds away from the cutting blades of a harvesting machine and the like, including a substantially U-shaped member mounted on the harvesting machine in advance of the cutting blades of the harvesting machine for depressing the weeds prior to their reaching the cutting blades of the harvesting machine, said U-shaped member including side legs joined by a member extending therebetween, support means on each side of the harvesting machine for receiving one of said legs of said U-shaped member, locking and release means on each of said support means for slidably receiving each of said legs of said U-shaped member whereby the position of said center member in advance of the cutting blades of the harvesting machine may be varied, a horizontal support member mounted on the harvesting machine below the cutting blades of the harvesting machine, support means on said U-shaped member extending angularly therefrom, said horizontal support member having slot means thereon for slidably receiving said angularly extending support means, and adjustable stop means on said angularly extending support means for limiting the travel of said angularly extending support means through said slot means.

2. An apparatus adapted to be positioned on a harvesting machine for deflecting weeds away from the cutting blades of the harvesting machine whereby substantially only the grain is harvested during harvesting including a depressing bar adapted to be horizontally positioned at variable distances in advance of the cutting blades of the harvesting machine and substantially parallel thereto, lateral bars on either side of said depressing bar for mounting said depressing bar on the harvesting machine, and connection means on the harvesting machine adapted to slidably receive said lateral bars, said connection means including a U bolt for receiving each of said lateral bars thereby permitting said lateral bars to be positioned in said U bolts at any point along the length of said lateral bars.

3. An apparatus adapted to be positioned on a harvesting machine for deflecting weeds away from the cutting blades of the harvesting machine whereby substantially only the grain is harvested during harvesting, including a depressing bar adapted to be horizontally positioned at variable substantially horizontal distances in advance of the cutting blades of the harvesting machine and substantially parallel thereto, lateral bars on either side of said depressing bar for mounting said depressing bar on the harvesting machine, connection means on the harvesting machine adapted to slidably receive said lateral bars, said connection means including a U bolt for receiving each of said lateral bars thereby permitting each of said lateral bars to be positioned in said U bolt at any point along the length of said lateral bars, angular support bars on said depressing bar for additional support thereof, a horizontal bar mounted on the harvesting machine below the cutting blades thereof, said horizontal bars having slot means thereon and below the cutting blades of the harvesting machine adapted to receive said angular support bars, and stop means on said angularly disposed support member for limiting the movement of said angular support member in said slot means.

4. An apparatus adapted to be positioned on a harvesting machine or the like for deflecting weeds away from the cutting blades of the harvesting machine whereby substantially only the grain is harvested during harvesting including, depressing means for depressing the weeds in advance of the cutting blades of the combine, side support means on said depressing means for supporting said depressing means, connection means on the harvesting machine for variably connecting said side support means on the combine whereby the horizontal distance said depression means is positioned in advance of the cutting blades of the harvesting machine may be varied, additional support means on said depressing member for providing additional support for said depressing member, receiving means on the combine for receiving said additional support means, and stop means on said additional support means whereby said support means is held in said receiving means in any position as desired.

5. An apparatus for deflecting weeds away from the cutting blades of a harvesting machine and the like, including a substantially U-shaped member mounted on the harvesting machine in advance of the cutting blades of the harvesting machine for depressing the weeds prior to their reaching the cutting blades of the harvesting machine, said U-shaped member including side legs joined by a member extending therebetween, support means on each side of the harvesting machine for receiving one of said legs of said U-shaped member, locking and release means on each of said support means for slidably receiving each of said legs of said U-shaped member whereby the position of said center member in advance of the cutting blades of the harvesting machine may be varied, a horizontal support member mounted on the harvesting machine below the cutting blades of the harvesting machine, a plurality of angularly extending brace members on said U-shaped member, said horizontal support member having slot means thereon for slidably receiving said brace members, and a plurality of adjustable stop means on said brace members for limiting the travel of said brace members through said slot means.

References Cited in the file of this patent
UNITED STATES PATENTS

| | | |
|---|---|---|
| 2,216,313 | Fulton | Oct. 1, 1940 |
| 2,333,153 | Crow | Nov. 2, 1943 |
| 2,865,161 | Nygren | Dec. 23, 1958 |